United States Patent [19]

Hahn

[11] Patent Number: 5,546,623
[45] Date of Patent: Aug. 20, 1996

[54] MAINTENANCE STRUT FOR DOCK LEVELER

[75] Inventor: Norbert Hahn, Franklin, Wis.

[73] Assignee: Rite-Hite Corporation, Milwaukee, Wis.

[21] Appl. No.: 395,672

[22] Filed: Feb. 28, 1995

[51] Int. Cl.$^6$ .................................................. E01D 1/00
[52] U.S. Cl. ............................................. 14/69.5; 14/71.1
[58] Field of Search .................................... 14/69.5, 71.1, 14/71.3, 71.7

[56] References Cited

U.S. PATENT DOCUMENTS

| 3,882,563 | 5/1975 | Smith et al. | 14/71.3 |
| 4,570,277 | 2/1986 | Hahn et al. | |
| 4,662,021 | 5/1987 | Hagen et al. | 14/71.7 X |

OTHER PUBLICATIONS

"MQ-1000 Dock Leveler"; Rite–Hite Corporation; Sep., 1993; 1 page.
"MQ-2000 Dock Leveler"; Rite Hite Corporation; Oct., 1993; 1 page.
"MQ-3000 Dock Leveler"; Rite Hite Corporation; Nov., 1993; 1 page.
"Owners Manual: Dyna–Load Hydraulic Dockleveler K Series"; Kelley Company, Inc.; Dec. 1, 1983; 4 pages.
"Kelley Hydraulic Dock Levelers" Kelley Corporation, Inc.; 1976; 2 pages.
"Loading Dock Equipment"; Pioneer Manufacturing Inc.; Date unknown; 1 page.
"Dock Equipment 93"; W. B. McGuire Company; Date unknown; 4 pages.
"Mechanical and Hydraulic Dock Levelers"; Blue Giant; Date Unknown; 2 pages.
"Poweramp Cleanpit"; Powerspan Bascule Bridges Poweramp; Date unknown; 2 pages.

*Primary Examiner*—Michael Powell Buiz
*Assistant Examiner*—James A. Lisehora
*Attorney, Agent, or Firm*—Leydig, Voit & Mayer, Ltd.

[57] ABSTRACT

A maintenance strut assembly for supporting a dock leveler in a maintenance position, the leveler being disposed above a dock platform surface and including a receiving opening, the strut assembly comprising a strut member adapted to be oriented in a supporting orientation between the leveler and a base member, and receivable within the receiving opening, the strut member including a lower portion and an upper portion extending above the top surface of the leveler in the maintenance position, a base member fixed beneath the leveler, the base member maintaining the strut member in a supporting orientation; and a supporting member fixed to the strut member and positioned along the strut member to engage the bottom surface of the leveler in the maintenance position to prevent downward movement of the leveler.

12 Claims, 1 Drawing Sheet

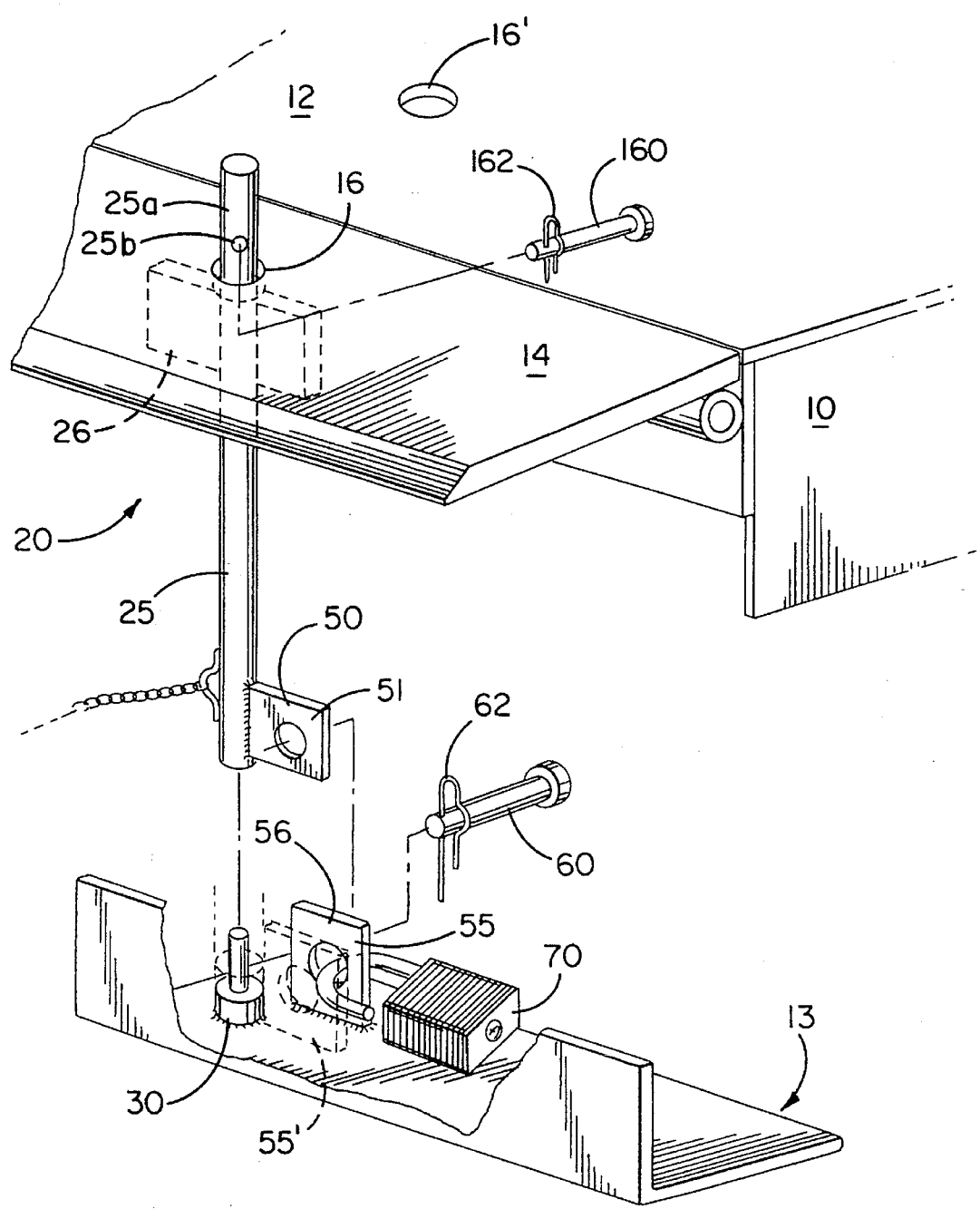

5,546,623

MAINTENANCE STRUT FOR DOCK LEVELER

FIELD OF THE INVENTION

The invention relates generally to a safety device for use in a loading dock, and particularly to an improved maintenance strut to allow maintenance to be performed on the underside of a dock leveler.

Loading dock facilities often employ a dock leveler to facilitate loading and unloading of various sized vehicles. Examples of such dock levelers are disclosed in U.S. Pat. Nos. 4,570,277 and 4,995,130. Dock levelers compensate for height variations between the bed of a vehicle parked on a road-way surface adjacent to the dock and the platform surface of the dock. This is accomplished by employing a deck which is hingedly connected at its rear edge to a frame usually mounted within a pit formed in the dock and open at the front and top sides. The deck is typically pivoted between a raised, or upwardly inclined, position above the dock platform surface, and a lowered, declined position below dock level to allow loading and unloading of vehicles which have beds above or below the platform surface of the dock. An extension plate, or lip, is hinged to the front edge of the deck and is moveable to an extended position to bridge the space between the rear edge of the bed of the parked vehicle and the front edge of the deck. For ease of reference, the deck and lip extension will be collectively referred to herein as a "dock leveler", in distinction to the "leveler frame", usually located in the dock pit. Dock levelers may be powered by electrical, hydraulic or pneumatic power means for movement between the various positions, such levelers typically being powered upward and allowed to fall by gravity into the down, engaged position with a truck bed. Other levelers are powered up by spring mechanisms, which bias the leveler in the raised position. Dock personnel then "walk down" the leveler, thereby exerting a downward force sufficient to overcome the spring bias and to allow the leveler to move to the lowered, engaged position where it is kept in position by a releasable hold down device, not forming part of this invention.

Whatever the type of leveler used, such levelers will periodically require maintenance to the underside of the leveler in the pit area where the means for moving the leveler are disposed. When maintenance personnel are in the pit area, it is important that the leveler be rigidly maintained in an elevated position. This not only insures adequate space in the pit for the purpose of performing the maintenance, but also prevents accidental downward movement of the leveler with personnel in the pit.

In order to maintain a leveler in a maintenance position, a separate strut (referred to herein as a "maintenance strut") is typically propped in place between the underside of the leveler assembly and the leveler frame in the pit. The strut is usually a metal rod, or some other rigid member. To maintain the strut in place, and to prevent it from accidentally being kicked out of its position between the underside of the leveler and the leveler framing, the leveler and the frame may each have a receptacle such as a cup for receiving the opposite ends of the maintenance strut. The leveler framing would have a means for maintaining the base of the strut such as an upwardly-facing cup while a downwardly-facing cup would be mounted to the underside of the leveler. This arrangement is satisfactory for maintaining a leveler in a maintenance position, since the strut is held in place within the two cups. At the same time, for the strut to be placed into position the cup arrangement allows for some vertical free play. If the leveler were to be accidentally raised beyond the length of the strut, the end of the maintenance strut received in the downwardly facing cup on the leveler could potentially become disengaged from that cup allowing the strut to tip out of its support position.

It is therefore desirable to provide a maintenance strut combining the advantageous function of existing maintenance struts (maintaining the leveler in a maintenance position), but that also maintains its functionality even in the event that the leveler is accidentally raised during maintenance. It would also be desirable for such an improved maintenance strut to be capable of being retrofitted to existing installations. Of course, simplicity of operation and ease of manufacture are always desirable for such structures.

SUMMARY OF THE INVENTION

Thus, it is a general object of the invention to provide an improved maintenance strut for a dock leveler which is capable of maintaining a dock leveler in a maintenance position.

It is another object of the present invention to provide a maintenance strut for a dock leveler which will maintain engagement with the leveler even upon an accidental upward movement of the leveler during maintenance.

It is a further object of the invention to provide an improved maintenance strut for a dock leveler that has improved stability to allow the maintenance strut to remain in its supporting position.

It is a further object of the invention to provide a maintenance strut for a dock leveler that can be retrofitted into existing installations.

Other objects and advantages of the invention, as well as additional inventive features, will be apparent from the description of the invention provided herein.

In accordance with one embodiment of the invention, the improved maintenance strut assembly includes a strut member. The bottom end of the strut member engages a base member which is mounted to the leveler frame or the dock pit. The receipt of the strut member on this base member maintains the strut member in a supporting orientation when the strut member is supporting the leveler. The upper end of the strut member is received within a receiving opening in the leveler deck or lip, which is sized to receive the strut member. Attached to the strut member is a supporting member. The position of the supporting member along the strut member is chosen such that the supporting member will engage the underside of the leveler when the dock leveler is in the desired maintenance position. That is, the upper end of the strut member will project through the opening in the leveler while the supporting member engages the underside surface of the leveler for the purpose of maintaining the dock leveler in the maintenance position. The strut member thus maintains its functionality even in the event that the leveler is accidentally activated during maintenance. Because the strut member extends through the opening in the leveler and above the surface of the leveler by a greater amount than the leveler can be elevated by its respective power means, the strut member will maintain engagement with the opening in the leveler even if the leveler is raised. Accordingly, if a leveler is accidentally raised during maintenance, and then allowed to fall, the maintenance strut assembly will still be in place and prevent further downward movement of the leveler since the portion of the strut member above the supporting member has been maintained in the opening in the leveler.

According to a preferred embodiment of the invention, the maintenance strut assembly also includes a retaining assembly for preventing vertical movement of the strut member. The retaining assembly is engagedly disposed between the strut member and the dock pit or the leveler framing, and couples these components together. If an accidental raising of the leveler were to cause the strut member to pinch within the receiving opening in the leveler, the retaining assembly would prevent vertical movement of the strut member and disengagement of the strut member and base member. Other advantages of this structure, as well as additional structure and refinement will be discussed in greater detail in the description of the invention provided below.

BRIEF DESCRIPTION OF THE DRAWINGS

The sole FIGURE is a perspective view of the maintenance strut according to the invention partially exploded, along with the dock leveler and leveler framing with which it is associated.

DESCRIPTION OF THE PREFERRED EMBODIMENT

While this invention will be described with reference to the preferred embodiment, it will be obvious to those of ordinary skill in the art that variations of the preferred embodiments may be used and it is intended that the invention may be practiced otherwise than as specifically described herein. Accordingly, this invention includes all modifications encompassed within the spirit and scope of the invention as defined by the following claims.

Turning now to the sole FIGURE, a perspective view of the maintenance strut assembly according to the invention is shown along with an associated leveler. A dock leveler 10 is represented including a deck surface 12 and a hinged lip 14. The hinged lip includes a receiving opening in the form of a hole 16 through which the strut member, to be discussed in greater detail below, is received. It Should be noted that the only modification necessary to existing levelers for the purpose of utilizing this invention is formation of a receiving opening such as the hole 16 in the leveler lip. It should further be noted that a receiving opening could be formed elsewhere on the leveler (such as in the deck portion as at 161) for receiving the strut member. Placing the receiving opening in the lip is preferred, however, as it allows the strut member to be placed near the front edge of the leveler for ease of installation as well as providing greater accessibility for service personnel. Furthermore, while the receiving opening in the present embodiment is a circular hole, other types of openings including, for example, square holes and elongated slots could be used according to the invention.

Maintenance strut 20 is composed primarily of a strut member illustratively in the form of tube 25 to which is attached (such as by welding) a supporting member, although the supporting member may be affixed to tube 25 by other means than welding. In the present embodiment, the supporting member is a block 26. Other forms of supporting members could also be used, such as a cylindrical collar surrounding the strut member, or cross pins affixed thereto. Further, a plurality of supporting members could be used. In any event, the supporting member or members are designed to engage and support the underside of the leveler to support the leveler in the maintenance position, as will be discussed in greater detail below.

To maintain the strut member in its supporting orientation, a base member illustratively in the form of a post 30 is deployed beneath the leveler. A supporting orientation of the maintenance strut is any orientation that would allow the strut to extend through the receiving opening, such that the supporting member could engage the underside of the leveler to maintain the leveler in the maintenance position. Typically, a supporting orientation would be one in which the strut was disposed at an angle greater than 45° from the horizontal, but lesser horizontal angles could be used. The base member maintains the strut in the supporting orientation by preventing movement of the lower end of the strut as would allow it to slide or otherwise move horizontally out of a supporting position. Preferably, the base member is welded, or otherwise affixed to, or forms a part of the framing of the dock leveler, such framing being designated by reference number 11. However, direct attachment of the base member 30 to the floor 13 of the dock pit is also possible. It should be noted that the only modification beneath the leveler for retrofit is the attachment of the base member to the pit floor 13 or to the framing 11. The diameter of the illustrative base member in the form of post 30 is selected to be slideably, yet snugly received within the diameter of the illustrative strut member in the form of tube 25. With tube 25 thus disposed on post 30, tube 25 is maintained in an illustrative substantially vertical supporting orientation to support the leveler 10 in a maintenance position by virtue of the supporting member 26 engaging the underside of lip 11. Of course, the strut member and base member according to the invention are not limited to this embodiment, and other configurations of strut members and base members, could be used to work within the scope of this invention.

With the leveler 10 maintained in the maintenance position by tube 25, an upper portion 25a of the tube 25 extends through hole 16 in the lip 14. At the same time, the block 26 engages the underside of the lip 14 to support the lip and the leveler in the maintenance position. Of course, the position of the block 26 along the tube 25 is chosen to give the leveler the desired maintenance position. Further, the placement of the post 30 on the framing 11 or the pit floor 13 should be chosen to give proper alignment between the tube 25 and the hole 16 on the lip.

As can be seen from the FIGURE, the maintenance strut will continue to perform its function even in the event of an accidental or unintended raising of the leveler 10 during maintenance. If that were to occur, the portion 25a of the tube 25 would still be maintained within hole 16 in the lip 14. Of course, the figure is only representative, and the portion 25a of the tube 25 may be made longer to allow a greater upward range of travel of the leveler 10 without portion 25a becoming disengaged from hole 16. Further, the portion 25a of the tube 25 could be painted or otherwise marked to provide an obvious visual indication to dock personnel at or above dock level that the maintenance strut is in place, since it would extend above the dock surface. Assuming an inadvertent upward movement of the leveler 10 followed by a downward movement, the maintenance strut 20 would remain in position and arrest that downward movement when the bottom surface of the lip 14 again made contact with the block 26. In the event of such circumstances, the presence of the post 30 maintains the tube 25 in a supporting orientation and prevents the strut from moving in any horizontal direction.

In the preferred embodiment shown in the FIGURE, maintenance strut assembly 20 also includes a retaining assembly. The retaining assembly prevents vertical movement of the strut member in the form of tube 25. Such prevention of vertical movement of the strut member may be required in situations where the receiving opening in the leveler is close in dimension to the strut member. In that circumstance, upward movement of the leveler may cause pinching between the receiving opening and the strut member. In the absence of the retaining assembly, this pinching could separate the strut member from the base member and inhibit the desired supporting function of the maintenance strut. The retaining assembly avoids this situation. The retaining assembly in this embodiment illustratively includes a securing flag 50 which may be welded or otherwise attached to the tube 25 near its bottom end. A complementary securing tab 55 is disposed beneath the leveler, such as by being attached adjacent to the dock pit floor 13, illustratively by attachment to the frame member or base member (attachment to the base member being shown in phantom at 55' in the FIGURE). Alternatively, the securing tab 55 could form a part of the base member. With the maintenance strut in its leveler supporting position, openings in the securing flag and securing tab (51 and 56 respectively) would be aligned. A securing member, illustratively a pin 60 or an optional padlock 70 would then secure the flag 50 and tab 55 together. A pin 62 or other suitable device could be threaded through the end of the securing pin 60 to prevent accidental withdrawal. Use of this retaining assembly prevents unauthorized, or accidental removal of the maintenance strut from its supporting position and prevents the undesirable vertical movement and potential resulting separation of tube 25 from post 30. One skilled in the art will appreciate that a wide variety of other retaining assemblies may be advantageously employed that would serve the function of retaining the strut member against vertical movement.

The maintenance strut assembly may also advantageously include an upward limit assembly. Such a limit assembly limits the range of travel of a leveler that is accidentally raised while the maintenance strut is in position supporting the leveler. In the present embodiment, the limit assembly is a pin 160 received within a hole 25b in the tube 25. The hole 25b is placed along tube 25 so as to be above the leveler when the leveler is in the maintenance position. Pin 160 may be held in place by a pin 162. With the limit assembly in place, inadvertent or accidental upward movement of the leveler would be arrested by engagement of the leveler with pin 160 assuming that a retaining assembly were in place. The invention is not limited to this embodiment of a limit assembly, however, and other such assemblies could be used.

There has thus been described an advantageous structure for a maintenance strut. By virtue of the strut member being maintained in the supporting orientation by the base member, the presence of a supporting member, and the presence of a receiving opening in the leveler, the dock leveler can be securely supported in the maintenance position. Moreover, upon accidental or inadvertent raising of the leveler during maintenance, and subsequent downward movement the extension of a portion of the strut member beyond the receiving opening allows the strut member to remain in place and arrest downward movement of the leveler at its maintenance position. A strut assembly including a retaining assembly prevents accidental or unauthorized removal during the supporting function of the strut, and prevents vertical separation between the strut member and base member.

What is claimed is:

1. A maintenance strut assembly for supporting a dock leveler in a maintenance position, the leveler including a deck, and being disposed within a dock pit such that the deck may be disposed above a dock platform surface, the leveler also including a receiving opening, the strut comprising in combination;

a strut member including a lower portion and an upper portion and receivable within the receiving opening in the leveler, the strut member being adapted to be oriented in a supporting orientation with the lower portion disposed beneath the leveler and the upper portion extending above the top surface of the leveler in the maintenance position;

a base member disposed beneath the leveler and engaging the lower portion of the strut member to maintain the strut member in the supporting orientation;

a supporting member fixed to the strut member, and positioned along the strut member to engage the underside of the leveler and prevent downward movement of the leveler beyond the maintenance position.

2. The maintenance strut assembly of claim 1, wherein the leveler includes framing, and the base member is fixed to the framing.

3. The maintenance strut assembly of claim 1, wherein the dock pit includes a floor, and the base member is attached adjacent the pit floor.

4. The maintenance strut assembly of claim 1, wherein the supporting member is welded to the strut member.

5. The maintenance strut assembly of claim 1, wherein the upper portion of the strut member includes a visual indication that the leveler is in the maintenance position.

6. The maintenance strut assembly of claim 1, including a retaining assembly, the retaining assembly being disposed between and coupling the strut member to the base member to prevent vertical movement of the strut member.

7. The maintenance strut assembly of claim 6, wherein the retaining assembly comprises a securing flag including a first opening fixed to the lower portion of the strut member, and a securing tab including a second opening fixed adjacent to the pit floor, the first and second openings being aligned to receive a securing member.

8. The maintenance strut assembly of claim 7, wherein the leveler includes framing and the securing tab is fixed to the leveler framing.

9. The maintenance strut assembly of claim 7, wherein the securing tab is fixed to the base member.

10. The maintenance strut assembly of claim 6, including an upward limit assembly disposed along the strut member above the upper surface of the leveler in the maintenance position, to prevent upward movement of the leveler.

11. The maintenance strut assembly of claim 1, wherein the leveler includes a lip, and the receiving opening is disposed in the lip.

12. The maintenance strut assembly of claim 1, wherein the receiving opening is disposed within the deck.

\* \* \* \* \*